United States Patent
Kubicko et al.

(10) Patent No.: US 6,446,547 B2
(45) Date of Patent: *Sep. 10, 2002

(54) FOOD PROCESSING APPLIANCE

(75) Inventors: Robert Kubicko, Southbury; Theodore B. Mulle, New Milford, both of CT (US); Asik Braginsky, Forest Hills, NY (US)

(73) Assignee: Conair Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/474,308

(22) Filed: Dec. 29, 1999

(51) Int. Cl.[7] .............................. A21C 1/02; B01F 7/20; A23P 1/00; B29B 7/00
(52) U.S. Cl. .............................. 99/467; 99/486; 366/97; 366/251; 366/293; 366/314; 366/601; 416/223 R; 416/228; 416/235; 241/24.26; 241/191; 241/282.1; 241/292.1
(58) Field of Search .................... 99/348, 467, 486; 366/251, 314, 96–99, 206, 279, 293, 601; 416/223 R, 228, 235; 241/191, 282.1, 292.1, 24.26

(56) References Cited

U.S. PATENT DOCUMENTS

| | | | |
|---|---|---|---|
| D195,728 S | * 7/1963 | Freedman et al. ............ D44/1 |
| 3,172,441 A | * 3/1965 | Hartwig et al. ............... 146/68 |
| 3,695,586 A | * 10/1972 | Griffin ........................ 259/24 |
| 3,934,860 A | * 1/1976 | Michels et al. ............. 259/108 |
| 4,143,824 A | * 3/1979 | Shiotani ................. 241/282.1 |
| 4,200,244 A | * 4/1980 | Sontheimer ............. 241/282.1 |
| 4,541,573 A | 9/1985 | Fujiwara et al. .............. 241/36 |
| 4,545,216 A | * 10/1985 | Cavalli ........................ 62/343 |
| 4,700,903 A | * 10/1987 | Henn ...................... 241/101.2 |
| 4,723,719 A | * 2/1988 | Williams ................. 241/282.2 |
| 4,752,041 A | * 6/1988 | Franke et al. ............ 241/282.1 |
| 4,766,766 A | * 8/1988 | Ahlert et al. ................. 73/169 |
| 4,790,665 A | 12/1988 | Hayashi ........................ 366/98 |
| 4,817,878 A | * 4/1989 | Shibata ................... 241/282.1 |
| 5,071,077 A | 12/1991 | Arroubi et al. .............. 241/366 |
| 5,158,434 A | * 10/1992 | Weetman ................. 416/201 A |
| 5,347,205 A | * 9/1994 | Piland ........................ 318/811 |
| 5,380,086 A | 1/1995 | Dickson ....................... 366/97 |
| 5,397,178 A | * 3/1995 | Konietzko .................. 366/197 |
| 5,556,198 A | 9/1996 | Dickson et al. ............... 366/97 |
| 5,599,103 A | * 2/1997 | Linscott ...................... 366/343 |
| 5,921,485 A | * 7/1999 | Plavcan et al. .......... 241/782.2 |
| 6,082,648 A | * 7/2000 | Marrier et al. .......... 241/282.1 |

* cited by examiner

Primary Examiner—Keith Hendricks
Assistant Examiner—Drew Becker
(74) Attorney, Agent, or Firm—Ohlandt Greeley Ruggiero & Perle, LLP

(57) ABSTRACT

A food processor that is operable in a dough mixing mode and in at least one other mixing mode. When in the dough mixing mode, the mixing impeller is driven at a continuous speed in the range of about 1,400 to about 1,600 rpm and preferably form about 1,400 rpm to about 1,550 rpm. When in the other mixing mode, the impeller is driven at a speed in excess of 1,600 rpm. The impeller has a blade assembly with an upper blade and a lower blade that are offset vertically and sloped toward one another to thereby slice a relatively wide swath of the dough ball during mixing.

10 Claims, 2 Drawing Sheets

FOOD PROCESSING APPLIANCE

FIELD OF THE INVENTION

This invention relates to a food processing appliance and method and, in particular, to a food processing appliance and method especially adapted for the mixing of bread dough.

DESCRIPTION OF THE ART

Food processing appliances generally have the capability of operating in a number of different modes to process a variety of foods with various impellers at impeller speeds appropriate for the specific food being processed. When in a bread processing or dough mixing mode, the temperature of the dough increases with increasing impeller speed. It is desirable to maintain the dough as cool as possible while mixing for proper formation of yeast and gas bubbles. For dough mixing, the impeller has generally been driven at a speed in excess of 1,600 rpm, usually at about 1,780 rpm.

U.S. Pat. No. 4,541,573 discloses a food processor that drives the impeller according to an impeller speed program for mixing dough that includes an initial period of nine seconds of intermittent operation at 1,600 rpm to avoid splattering of dry flour and water ingredients. The initial period is followed by a second period of nine seconds of intermittent operation at 3,300 rpm. Then, the impeller is continuously driven during a third period of 35 seconds at 2,500 rpm. The speed program ends with a final period of 32 seconds of intermittent operation between 1,600 rpm and 2,500 rpm. Except for the initial and final periods, the dough mixing speed is continuously 2,500 rpm.

Gluten is important to making high quality bread without large holes or air cavities. Gluten is either present in the flour or can be added. During the mixing process, gluten is developed to provide a web like consistency to the dough. Mixing with impeller speeds in excess of 1,600 rpm can result in poorly developed gluten, thereby giving rise to poor quality bread.

An impeller used for dough mixing has an S-shape as shown, for example, in the aforementioned U.S. Pat. No. 4,541,573. The S-shaped impeller has two blades that extend from opposed areas along the circumference of an impeller shaft, offset vertically from one another by a small distance. The blades have sharpened leading edges that cut into the dough ball at two distinct levels.

Another impeller used for mixing dough has a planar elongate blade with vertically extending blade tips as shown in U.S. Pat. No. 5,380,086. This blade cuts into the dough ball at only a single level.

Accordingly, there is a need for an improved food processor that is operable at low speeds to mix bread dough, thereby providing a relatively cool dough ball.

SUMMARY OF THE INVENTION

A food processor according to the present invention includes a motor that drives an impeller. A mode control establishes a bread dough mixing mode and at least one other mixing mode. A motor control responds to the mode control to operate the motor to drive the impeller at a continuous speed in the range of about 1,400 rpm to about 1,600 rpm during the bread dough mixing mode and at a speed in excess of 1,600 rpm during the other mode. More preferably, the range is about 1,400 rpm to about 1,550 rpm. Most preferably, the continuous speed is about 1,500 rpm. The continuous speed endures for a substantial portion of the dough mixing mode.

The method of the present invention operates a food processor that has a mixing impeller operable in a bread dough mixing mode and at least one other mode. The method signals that the food processor is in the bread dough mixing mode or in the other mode. If in the bread dough mixing mode, the impeller is driven at a continuous speed in the range of about 1,400 rpm to about 1,600 rpm. If in the other mixing mode, the impeller is driven at a speed in excess of 1,600 rpm.

An impeller for mixing dough according to the invention includes an impeller shaft with a blade assembly. The blade assembly includes an upper blade and a lower blade offset vertically from one another and sloping toward one another to thereby slice a relatively wide swath of the dough ball. The upper blade has a downwardly sloping tip and the lower blade has an upwardly sloping tip. The slopes of the upper and lower blades are preferably in the range of about 10° to about 30°. The slopes of the blade tips are preferably less than about 10°.

The food processor and method of the present invention also incorporates the impeller of the invention to provide high quality dough ball mixing.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE INVENTION

Figure 1:
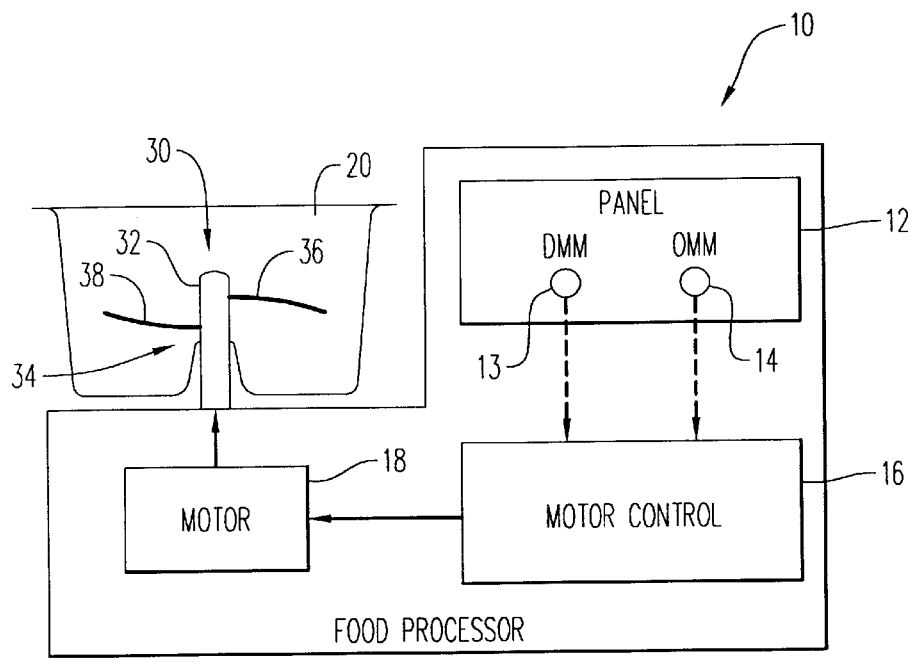
FIG. 1 is a schematic diagram of a food processor according to the invention.

Referring to FIG. 1, a food processor 10 according to the invention includes a panel 12, a motor control 16, a motor 18, a mixing container 20 and an impeller 30.

Food processor 10 is operable in at least two modes to process food in container 20 with impeller 30. To this end, panel 12 includes a dough mixing mode switch 13 and an other mixing mode switch 14. Panel 12 may include other operator controls, such as an on/off switch, further food processing modes and the like, none of which are shown in FIG. 1. When dough mixing mode switch 13 is actuated, the dough mixing mode is established. On the other hand, when the other mixing mode switch 14 is actuated, the other mixing mode is established. As shown by the dotted lines, switches 13 and 14 provide connections to motor control 16 that signal the dough mixing mode and the other mixing mode, respectively.

Motor control 16 responds to the signaled mode to control the speed of motor 18 and, hence, the speed of impeller 30. According to the invention, motor control 16 controls the speed of motor 18 to impart a relatively low continuous speed to impeller 30 during a substantial portion of the dough mixing mode and a relatively high speed to impeller 30 during the other mixing mode. In particular, the impeller speed during the dough mixing mode is in the range of about 1,400 rpm to about 1,600 rpm, preferably in the range of about 1,400 rpm to about 1,550 rpm, and most preferably in the range of about 1,450 rpm to about 1,550 rpm. In one design embodying the invention, the impeller speed is continuous at about 1,500 rpm during the dough mixing mode. The impeller speed during the other mixing mode is in excess of 1,600 rpm.

The inventors have discovered that by controlling the impeller speed to be in the above described ranges during the dough mixing mode, the dough temperature is cooler than the dough temperature when mixed at higher speeds, such as 1,780 rpm. Also, the lower impeller speed produces higher quality bread with fewer holes, indicating that gluten is properly developed during mixing.

Motor 18 has an output shaft that is coupled via a coupler to impeller 30. The coupler forms no part of the present invention and is, therefore, not shown on the drawing. Motor 18 may be any suitable motor capable of driving mixing impeller 30 for food processing applications, such as, a universal motor, an induction motor, a dc motor and the like. Motor control 16 may be any suitable motor speed control for such motors for food processing applications.

Referring to FIGS. 1 through 5, impeller 30 includes an impeller shaft 32 and a blade assembly 34. Blade assembly 34 includes an upper blade 36 and a lower blade 38 disposed on opposite sides of the circumference of impeller shaft 32. The vertical offset between upper and lower blades 36 and 38 is typically about 0.375 inch.

Figure 4:
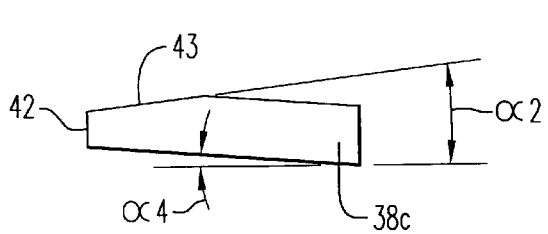
FIG. 4 is an end view of the bottom blade of the impeller.
Figure 5:
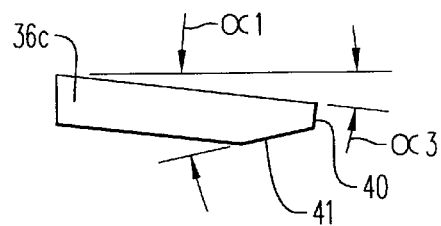
FIG. 5 is an end view of the top blade of the impeller.
Figure 3:
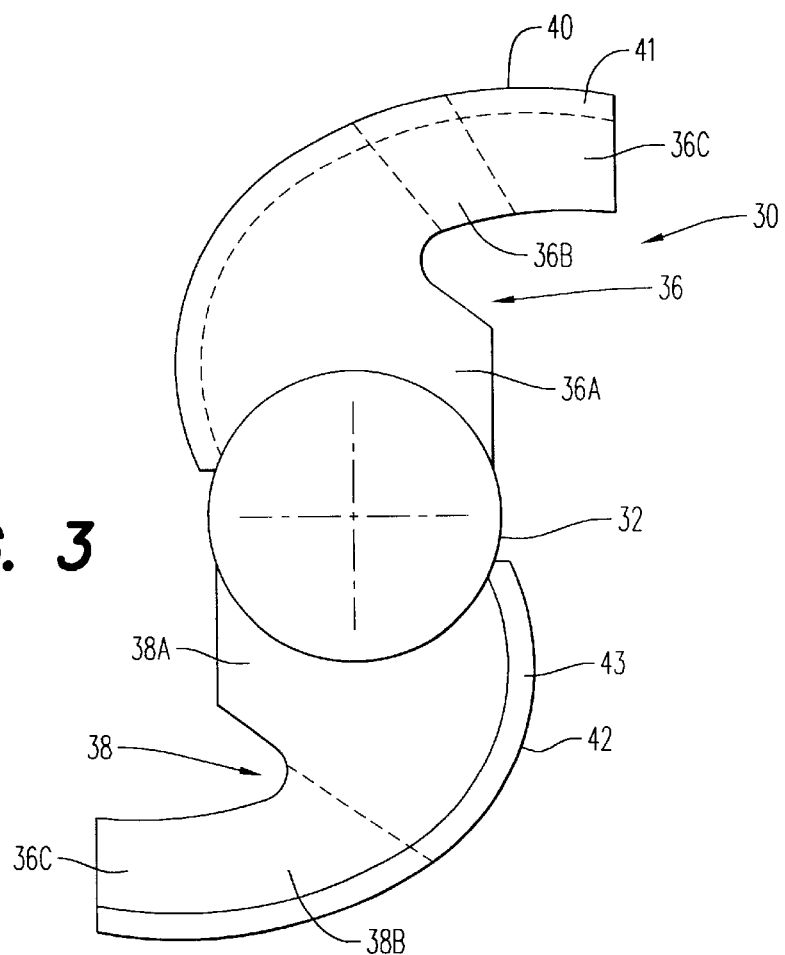
FIG. 3 is a top view of the impeller.
Figure 2:
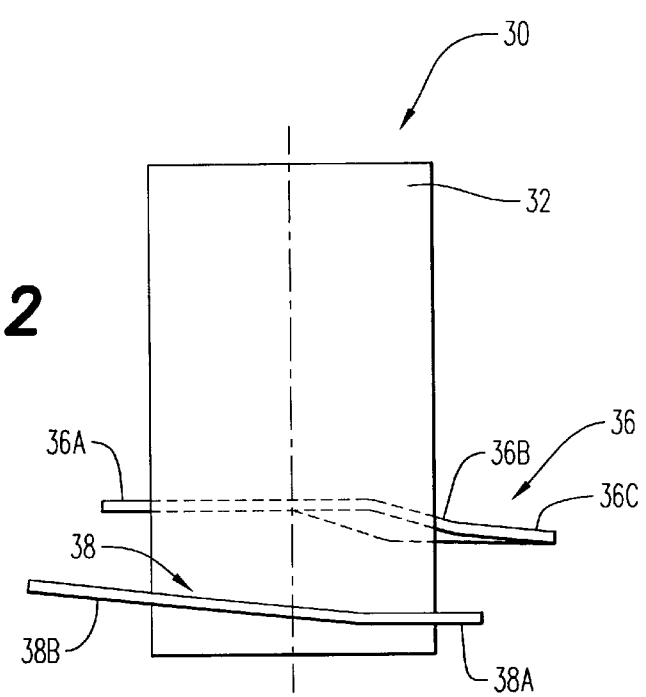
FIG. 2 is an elevational view of the impeller of the food processor of FIG. 1.

With specific reference to FIGS. 3 through 5, upper blade 36 has a leading edge 40 with an upwardly sloping chamfer 41 and lower blade 38 has a leading edge 42 with a downwardly sloping chamfer 43. Chamfers 41 and 43 are selected to give a dull edge to leading edges 40 and 42, respectively.

Upper blade 36 has a generally horizontal blade portion 36A (FIG. 3), a downwardly sloped portion 36B and a downwardly sloped tip 36C. Lower blade 38 has a generally horizontal blade portion 38A, an upwardly sloped portion 38B and an upwardly sloped tip 38C. A slope angle $\alpha 1$ with respect to the horizontal for downwardly sloped portion 36B and a slope angle $\alpha 2$ with respect to the horizontal for upwardly sloped portion 38B are preferably in the range of about 10° to 30°. In one design embodying the invention the angles $\alpha 1$ and $\alpha 2$ are equal and are about 20°. A tip angle $\alpha 3$ for upper blade tip 36C and a tip angle $\alpha 4$ for lower blade tip 38C are preferably less than 10°. Preferably $\alpha 3$ is greater than $\alpha 4$.

The oppositely sloped blades 36 and 38 enhance mixing of the dough with slicing across a horizontal thickness of the dough as contrasted with a single slice or two level slice of prior art blades. The oppositely sloping tips 36C and 38C give a folding action that is either up or down depending on the values of $\alpha 3$ and $\alpha 4$. The angles impart a lifting and churning action which aids in producing a thorough dispersing of ingredients, resulting in a homogeneous dough mixture.

The present invention having been thus described with particular reference to the preferred forms thereof, it will be obvious that various changes and modifications may be made therein without departing from the spirit and scope of the present invention as defined in the appended claims.

What is claimed is:

1. A food processor having a bread mixing mode, the food processor comprising:
    a motor;
    an impeller driven by the motor, wherein the impeller includes an impeller shaft with a blade assembly, the blade assembly including an upper blade and lower blade, each of the upper and lower blades having a horizontal blade portion perpendicular to the impeller shaft, an intermediate blade portion having a slope in the range of about 10° to about 30° with respect to the horizontal blade portion, and a tip portion having a slope that is less than 10° with respect to the horizontal blade portion, the whole upper and lower blades being offset vertically from each other and sloping toward each other, wherein the upper blade slopes downwardly and the lower blade slopes upwardly;
    a mode control that establishes a bread dough mixing mode and at least one other mixing mode; and
    a motor control that responds to the mode control to operate the motor to drive the impeller in the bread dough mixing mode and the at least one other mode.

2. The food processor of claim 1, wherein the motor control responds to the mode control to drive the motor in the range of about 1,400 rpm to about 1600 rpm.

3. The food processor of claim 2, wherein said continuous speed is about 1,500 rpm.

4. The food processor of claim 2, wherein the impeller is driven at the continuous speed for a portion of the dough mixing mode.

5. The food processor of claim 1, wherein the blade assembly has an S-shape.

6. An impeller for mixing dough, said impeller comprising an impeller shaft with a blade assembly, the blade assembly including an upper blade and a lower blade, each of the upper and lower blades having a horizontal blade portion perpendicular to the impeller shaft, an intermediate blade portion having a slope in the range of about 10° to about 30° with respect to the horizontal blade portion, and a tip portion having a slope that is less than about 10° with respect to the horizontal portion, wherein the whole upper and lower blades are each offset vertically from one another and sloping toward each other, and the intermediate blade portion of the upper blade slopes downwardly and the intermediate blade portion of the lower blade slopes upwardly.

7. The impeller of claim 6, wherein the blade assembly has an S-shape.

8. A bread dough mixer comprising an impeller driven by a motor at a continuous speed, wherein the impeller includes an impeller shaft with a blade assembly, the blade assembly including an upper blade and a lower blade, each of the upper and lower blades having a horizontal blade portion perpendicular to the impeller shaft, an intermediate blade portion having a slope in the range of about 10° to about 30° with respect to the horizontal blade portion, and a tip portion having a slope that is less than about 10° with respect to the horizontal portion, wherein whole upper and lower blades are each offset vertically by a distance from each other and sloping toward one another, wherein the intermediate blade portion of the upper blade slopes downwardly and the intermediate blade portion of the lower blade slopes upwardly.

9. The bread dough mixer of claim 8, wherein the impeller is driven by the motor at a continuous speed in the range of about 1,400 rpm to about 1,600 rpm.

10. The bread dough mixer of claim 8, wherein the blade assembly has an S-shape.

* * * * *